United States Patent [19]

Mikhail

[11] Patent Number: 4,796,534
[45] Date of Patent: Jan. 10, 1989

[54] SPINNING RAMJET VEHICLE WITH A NON-SPINNING COMBUSTOR

[75] Inventor: Ameer G. Mikhail, Bel Air, Md.

[73] Assignee: The United States of America as represented by the Secretary of the Army, Washington, D.C.

[21] Appl. No.: 146,914

[22] Filed: Jan. 22, 1988

[51] Int. Cl.⁴ ............................................. F42B 15/00
[52] U.S. Cl. .................................. 102/374; 102/503; 60/201
[58] Field of Search ............... 102/374, 503; 244/323; 60/270.1, 245, 251, 201

[56] References Cited

U.S. PATENT DOCUMENTS

| | | | |
|---|---|---|---|
| 2,623,465 | 12/1952 | Jasse | 60/201 |
| 2,709,889 | 6/1955 | Mount | 60/201 |
| 2,831,320 | 4/1958 | Duncan | 60/201 |
| 2,849,955 | 9/1958 | Smathers | 60/201 |
| 3,267,854 | 8/1966 | Michelson | 244/3.23 |
| 3,903,802 | 9/1975 | Squiers | 102/374 |

Primary Examiner—Charles T. Jordan
Assistant Examiner—Michael J. Carone
Attorney, Agent, or Firm—Saul Elbaum; Guy M. Miller; Thomas E. McDonald

[57] ABSTRACT

A spinning ramjet vehicle is provided wherein the combustion process is enhanced. An injector intakes air and discharges it to an internal combustor. The combustor is separated from the vehicle body and allowed to rotate independently of spin imparted to the vehicle. The combustion process is enhanced as the spin rate of the combustor is less than that of the vehicle.

8 Claims, 2 Drawing Sheets

SPINNING RAMJET VEHICLE WITH A NON-SPINNING COMBUSTOR

RIGHTS OF THE GOVERNMENT

The invention described herein may be manufactured, used and licensed by or for the United States Government for Governmental purposes without payment to me of any royalty thereon.

BACKGROUND OF THE INVENTION

1. Field of the invention

The present invention relates to ramjet vehicles and more particularly to a technique to improve the combustion process in spinning ramjet vehicles.

2. Description of the Prior Art

Projectiles are vehicles that are launches from tanks, artillery pieces or generally, gun tubes. For most applications, gun tubes have helical grooves to provide the launched vehicle with the necessary spinning motion to avoid in-flight dynamic instability that causes the projectile to deviate from its intended path, range and target.

Recently, the concept of air breathing ramjet engines was introduced to the projectile field by using an annular solid fuel grain which internally lines the wall of a tubular projectile body. Results for these projectiles proved to be successful for special size (caliber) category projectiles which are spun about 50,000 revolutions per minute. However, for smaller size (caliber) projectiles, the spin rate necessary for in-flight stability is higher or in the range of 75,000 to 125,000 revolutions per minute. For these smaller size projectiles, preliminary free-flight tests yielded less successful results and inconsistency. A ramjet vehicle is usually launched at high supersonic speeds (5000 ft./sec.). For many projectile applications, this high speed is also coupled with a high rate of spin for some unfinned projectiles. It was found that when using smaller size models, with higher spin rates, the combustion process performance deteriorates. The erratic results were attributed to inconsistent combustion taking place by the solid fuel grain in the smaller size projectiles. These combustion difficulties were attributed to downsizing (scaling) difficulties, shorter flow residence time inside the combustor of the projectile, and higher spin rates. Possible consequences of these higher spin rates are, degrading of the mixing processes between the air and fuel vapor, reduction of the regression rate of the solid fuel grain inside the combustor, and failure of the fuel grain to ignite. Reducing these spin effects on the combustor flow within the projectile body will result in a more reliable and efficient combustion process.

The existing art does not include any spin effect reduction mechanisms for spinning ramjet vehicles. No spin dis-engagement mechanisms are known to exist. The spin dis-engagement of the combustor will reduce the effect of spin on the combustion process which experimentally was found to be damaging to the performance of the vehicle, at high spin rates.

The present invention not only reduces the spin effects but also enhances the combustion process in two locations with two different mechanisms. The first location in which enhancement occurs is at the cumbustor inlet, through the mechanism of swirling flow. The second locaton in which enhancement occurs is at the combustor exit, through the mechansim of added mixing of the unburned fuel, incomplete combustion products, and the pure air core.

SUMMARY OF THE INVENTION

Accordingly, it is an object of the present invention to provide a ramjet vehicle whose combustion process is almost unaffected by spin of the vehicle by allowing the internal combustor of the projectile to slip independently of the spinning projectile shell body.

It is a further object of the invention to provide an internal combustor that rotates independently of the projectile shell body without causing a major increase in complexity of the vehicle design or interference with projectile geometry, aerodynamics or function.

It is a still further object of the invention to provide an independently rotatable combustor that is applicable to both solid-fueled and premixed liquid fueled ramjets.

These and other objects are achieved by designing a ramjet vehicle that has an internal combustor which is allowed to rotate independently of the vehicle body. The ramjet vehicle or projectile comprises an injector member, combustor, and nozzle member inclosed within the projectile shell body. The injector member intakes air and discharges it for use by the combustor. The combustor receives the air from the injector, and uses it for the combustion process, discharging gases from this process to the nozzle. The combustor is supported within the shell body in such a way that allows it to rotate independently of the projectile shell body. Consequently, the combustor will rotate at a much slower rate, or not at all, when the projectile is fired from a gun tube with internal helical grooves. This technique results in an improved combustion process, increased fuel ignition sensitivity, consistency in sustaining or quenching the combustion process and an increase in solid fuel grain regression rate.

The above and other objects, features and advantages of the present invention will be better understood from the following detailed description taken in conjuction with the accompanying drawings.

DESCRIPTION OF THE PREFERRED EMBODIMENTS

Figure 1:
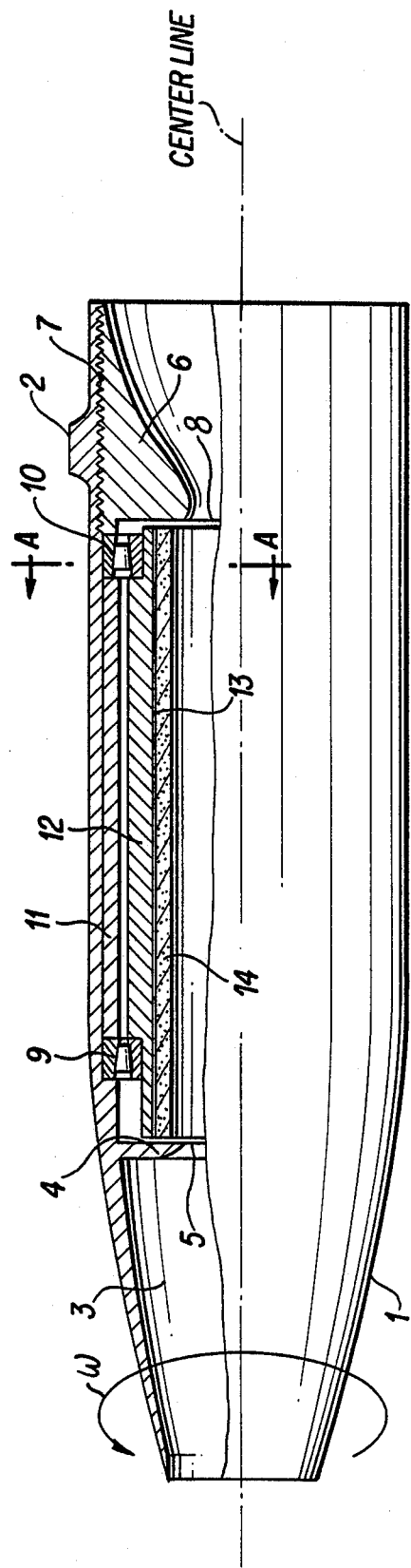
FIG. 1 shows a one-half sectional view of a hollow, air breathing, solid fuel ramjet projectile in accordance with the present invention.

A hollow, air breathing, solid fuel ramjet projectile is shown in FIG. 1. The outer shell body 1 is shown spinning at a rate $\omega$ revolutions per minute, (rpm). A rotating band, 2, is shown which grips the helical grooves inside a gun tube from which the projectile is fired, imparting spin to the shell body, 1, when it slides through the tube. A sabot assembly may be used instead of a rotating band, 2, to impart the spin to the projectile. In either case the way in which spin is imparted to the invention is not a feature of the present invention. They are merely mentioned to indicate how spin may be imparted to the projectile.

The internal configuration of the projectile includes an air-intake member 3 that intakes air and passes it to a combustor inlet 4, or "flame holder". This inlet ends with an injector plane 5 or inlet plane to the combustor. A nozzle member 6, is screwed into the main projectile body 1 through threads 7. A nozzle inlet plane 8 is also the combustor exit plane. Two slip rings 9 and 10, which may use ball-bearings or generally roller bearings, are shown separated by a tubular spacer 11. Each roller bearing has two coaxial rings separated by the rollers.

The outer rings are seated snugly against the inner surface of the shell body, while the inner rings will slip, carrying the combustor tubular wall 12, which is then free to rotate independently from the projectile body 1. The combustor wall 12 is bonded strongly, through a thin bonding material, 13, to the tubular solid fuel grain 14.

Figure 2:
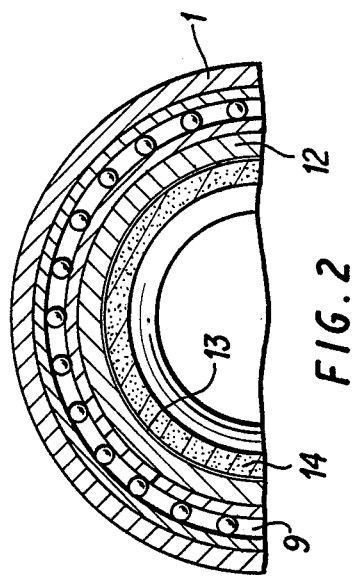
FIG. 2 shows a sectional view taken on the plane A-A of the one-half sectional view of FIG. 1.

FIG. 2 shows a sectional detailed view of FIG. 1 taken on the plane A—A with the most inner annular layer being the fuel grain 14 and the outer most layer being the wall body, 1, of the projectile.

Figure 3:
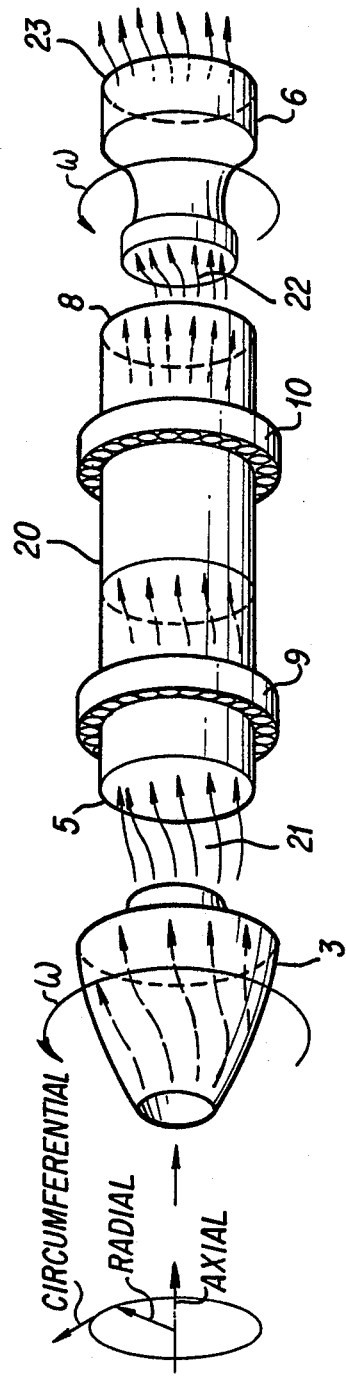
FIG. 3 shows an exploded view of the inside of the projectile, indicating air flow between the different sections.

FIG. 3 shows an exploded view of the inside of the projectile comprising the air-intake member 3, combustor 20 and nozzle member 6. Air flow within the projectile is shown with emphasis given to the two locations where the flow passes between two different sections. One of which is spinning while the other is not. The injector member 3 and nozzle member 6 are spinning at a rate $\omega$ due to the firing of the projectile through the gun tube. Combustor 20, supported by slip rings 9 and 10 is shown without any rotation. However, it is understood that the slip rings will not totally disengage the combustor to a zero spin rate, but rather to only a small fraction of the outer spin rate.

The air-intake member 3 intakes air as the projectile travels on its designated trajectory and discharges it as swirling flow 21 at the injector plane or combustor inlet plane 5. The swirling discharged air 21 has axial, radial and circumferential components. This swirling flow then enters the "non-spinning" combustor 20. This flow condition is equivalent to a nonspinning combustor body receiving a swirling flow at its inlet. This is a welcome benefit as it is recognized that in other combustor applications, elaborate swirling devices and mechanisms are introduced to cause and create this swirling motion at the inlet of a combustor. Swirling motion, in the proper amount, is known to enhance mixing of the gaseous mixture and enhance the combustion process and efficiency. The air flow will then proceed through the combustor, tending to align itself with its main axis and tending to recover from the swirling motion being forced on it at the inlet. The air flow changes its motion again at the combustor exit and nozzle inlet plane 8 where another strong swirling motion is developed, indicated by 22. This swirling motion will cause more diffusion (mixing) between the pure air core, the unburned fuel, and the incompletely oxidized fuel products which are concentrated near the fuel grain wall. This diffusion will result in a secondary combustion between the unburned fuel and the air in the nozzle region resulting in better overall combustion efficiency. The flow will then exit from the spinning nozzle into the still ambient air, with some additional secondary combustion taking place in the region after the nozzle exit plane 23.

Figure 4:
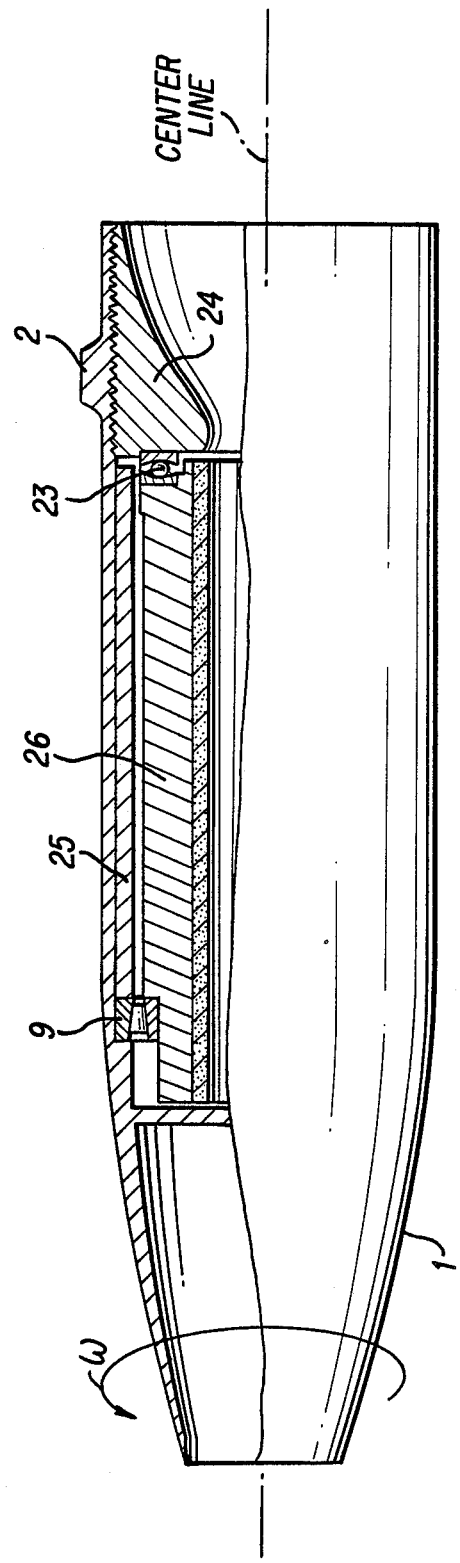
FIG. 4 shows an alternate embodiment of the present invention in which slip rings have been positioned to better withstand large axial forces.

Projectiles are subjected to very large accelerations at launch, resulting in large axial forces on its internal parts and on its shell body 1. The slip rings chosen should be capable of surviving such large axial loads at launch. FIG. 4 shows another embodiment of the present invention with slip ring 10 of FIG. 1 being replaced by slip ring 23 in a form enabling it to withstand large axial forces. Some design changes in the nozzle member, 24, the tubular spacer, 25, and the combustor wall, 26 are needed to accomodate such a design as shown in FIG. 4.

Shields for heat protection for the slip rings, and gas leak seals may be included in the design arrangement. However, they are not shown in the present arrangements because their use is purely a matter of design detail and are not related to the present invention.

It will be apparent that the embodiments shown are only exemplary and that various modifications can be made in construction and arrangement within the scope of the invention. In addition, although a solid fuel ramjet is shown, the concept is applicable to premixed liquid fueled ramjets as well.

I claim:

1. A rotating ramjet propelled vehicle comprising:
    a generally cylindrical outer shell body that rotates about a longitudinal axis, said outer shell body having forward and rearward ends;
    means, within and at the forward end of said outer shell body, for receiving intake air;
    means, within said outer shell body and positioned between said forward and rearward ends of said outer shell body, for providing combustion with said intake air thereby providing propulsion gases;
    means, separating said combustion means from said outer shell body, for rotatably mounting said combustion means within said outer shell body to allow said combustion means to rotate about the longitudinal axis at a slower rate than said outer shell body; and
    means, within and at the rearward end of said outer shell body for expelling the propulsion gases generated by the combustion means.

2. A rotating ramjet propelled vehicle as recited in claim 1 wherein said means for rotatably mounting said combustion means comprises a plurality of slip rings.

3. A rotating ramjet propelled vehicle as recited in claim 2 wherein each slip ring has an outer ring and an inner ring in a coaxial arrangement separated by bearings, where each outer ring is seated snugly against the inner surface of said shell body while each inner ring surrounds said combustion means.

4. A rotating ramjet propelled vehicle as recited in claim 3 wherein said means for providing combustion comprises a generally cylindrical tubular member with a layer of solid fuel grain bonded to the inner surface of said tubular member.

5. A rotating ramjet propelled vehicle comprising:
    a generally cylindrical shell body that rotates about a longitudinal axis at a particular rate, said shell body having forward and rearward ends;
    an air-intake member, disposed within and at said forward end of said shell body, having a passage extending therethrough for intaking and discharging air;
    a generally cylindrical combustor disposed within and in axial alignment with said shell body positioned between said forward and rearward ends of said shell body, said combustor having a combustor inlet for receiving the air from said air-intake member and a combustor outlet for discharging gases from the combustion process within said combustor;

a plurality of slip rings surrounding said combustor, wherein each slip ring has an outer ring and an inner ring in coaxial arrangement separated by bearings, where each outer ring is seated snugly against the inner surface of said shell body while each inner ring surrounds said combustor for allowing said combustor to rotate about the longitudinal axis at a slower rate than said shell body; and a nozzle member disposed within and at said rearward end of said shell body, having a nozzle inlet for receiving the gases from said combustor and a nozzle outlet for discharging the gases from said ramjet vehicle; whereby the combustion process within said combustor is made more reliable and efficient by allowing said combustor to rotate at a slower rate than the particular rate of the shell body.

6. A rotating ramjet propelled vehicle as recited in claim 5 further comprising tubular spacers surrounding said combustor and disposed between said plurality of slip rings.

7. A rotating ramjet propelled vehicle as recited in claim 5 wherein said bearings are ball-bearings.

8. A rotating ramjet propelled vehicle as recited in claim 5 wherein said bearings are roller-bearings.

* * * * *